United States Patent
Paik

(10) Patent No.: US 11,313,137 B2
(45) Date of Patent: Apr. 26, 2022

(54) ACOUSTIC FLOORING ASSEMBLY

(71) Applicant: Cary Paik, New York, NY (US)

(72) Inventor: Cary Paik, New York, NY (US)

(*) Notice: Subject to any disclaimer, the term of this patent is extended or adjusted under 35 U.S.C. 154(b) by 0 days.

(21) Appl. No.: 16/469,376

(22) PCT Filed: Oct. 4, 2018

(86) PCT No.: PCT/US2018/054303
§ 371 (c)(1),
(2) Date: Sep. 12, 2019

(87) PCT Pub. No.: WO2019/089182
PCT Pub. Date: May 9, 2019

(65) Prior Publication Data
US 2020/0208416 A1 Jul. 2, 2020

(51) Int. Cl.
E04F 15/10 (2006.01)
E04F 15/02 (2006.01)
B32B 3/06 (2006.01)
B32B 7/12 (2006.01)
B32B 7/08 (2019.01)
E04F 15/18 (2006.01)
E04F 15/20 (2006.01)

(52) U.S. Cl.
CPC .............. *E04F 15/107* (2013.01); *B32B 3/06* (2013.01); *B32B 7/08* (2013.01); *B32B 7/12* (2013.01); *E04F 15/02038* (2013.01); *E04F 15/02044* (2013.01); *E04F 15/181* (2013.01); *E04F 15/206* (2013.01); *B32B 2307/102* (2013.01); *B32B 2419/04* (2013.01); *B32B 2471/00* (2013.01); *E04F 2015/02116* (2013.01); *E04F 2201/0107* (2013.01); *E04F 2201/023* (2013.01); *E04F 2201/043* (2013.01); *E04F 2290/041* (2013.01)

(58) Field of Classification Search
CPC ......... E04F 15/017; E04F 15/02; E04F 15/18; E04F 13/0894; B32B 3/06; B32B 2419/04
USPC .......................................................... 52/578
See application file for complete search history.

(56) References Cited

U.S. PATENT DOCUMENTS

| | | | | |
|---|---|---|---|---|
| 2,758,044 A * | 8/1956 | Terry | .................... | E04F 15/105 428/535 |
| 3,760,548 A * | 9/1973 | Sauer | .................... | E04B 1/6179 52/592.1 |
| 6,334,280 B1 * | 1/2002 | Frappart | ................. | B28B 11/08 52/144 |
| 6,676,199 B2 * | 1/2004 | Buisson | .................... | B32B 3/12 296/193.07 |
| 8,245,478 B2 * | 8/2012 | Bergelin | ............... | E04F 15/181 52/592.1 |
| 8,991,055 B2 * | 3/2015 | Cappelle | ........... | E04F 15/02038 29/897.32 |
| 9,834,158 B2 * | 12/2017 | Paik | ........................ | E04F 13/08 |

(Continued)

*Primary Examiner* — Paola Agudelo
(74) *Attorney, Agent, or Firm* — Dennis Clarke

(57) ABSTRACT

A flooring assembly comprising a flooring unit comprising a stability core layer having a plurality of edge surfaces, two of which have an interlocking mechanism for attachment to the edge surfaces of the stability core of adjacent flooring units; a sound attenuating acoustic layer attached to the bottom surface of the stability core layer; and a finish layer attached to the top surface of said stability core layer.

12 Claims, 1 Drawing Sheet

(56) References Cited

U.S. PATENT DOCUMENTS

| | | | | |
|---|---|---|---|---|
| 2004/0255538 A1* | 12/2004 | Ruhdorfer | E04F 15/181 | 52/506.01 |
| 2005/0211402 A1* | 9/2005 | Uryu | H04R 7/02 | 162/138 |
| 2005/0215409 A1* | 9/2005 | Abramson | B65H 29/22 | 493/476 |
| 2006/0154015 A1* | 7/2006 | Miller | E04F 15/085 | 428/50 |
| 2006/0174974 A1* | 8/2006 | Brannstrom | B32B 7/02 | 144/345 |
| 2008/0168742 A1* | 7/2008 | Miclo | E04F 15/102 | 52/745.19 |
| 2008/0261036 A1* | 10/2008 | Wu | E04F 15/02 | 428/337 |
| 2008/0271400 A1* | 11/2008 | Raidt | E04F 15/182 | 52/408 |
| 2009/0183457 A1* | 7/2009 | Boucke | B32B 21/04 | 52/425 |
| 2009/0269522 A1* | 10/2009 | Liu | E04B 5/12 | 428/33 |
| 2011/0023789 A1* | 2/2011 | Delagrammatikas | A61D 7/04 | 119/420 |
| 2013/0108086 A1* | 5/2013 | Yamashita | H04R 19/02 | 381/191 |
| 2014/0311086 A1* | 10/2014 | Braun | E04C 2/246 | 52/783.1 |
| 2015/0121793 A1* | 5/2015 | Segaert | E04F 15/102 | 52/506.01 |
| 2015/0298426 A1* | 10/2015 | Hannig | B32B 5/022 | 428/192 |

* cited by examiner

ACOUSTIC FLOORING ASSEMBLY

BACKGROUND OF THE INVENTION

Flooring assemblies comprising flooring elements configured to be joined together to form finished floors having acoustic, sound-attenuating properties meeting or surpassing building sound code requirements (STC and IIC ratings) are highly desirous in the building industry. These codes require a high degree of suppression of sound transmissions between floors of buildings. Conventionally employed flooring elements may comprise multi-layer composite laminates having acoustic, sound-attenuating properties adapted for attachment thereof to subfloor substrates.

The most common forms of attachment to subfloors of floor assemblies constructed of conventional flooring elements are mechanical in nature; i.e., nails, staples, bolts, screws, and the like. The penetration of the acoustic, sound-attenuating portions of these laminates with such rigid attachment elements, however, provide sound bridges which result in the direct transmission of vibrational energy, particularly sound energy, through the acoustic layer, thereby deleteriously affecting the sound-attenuating properties thereof. This vibrational energy typically manifests as noise. In particular, low-frequency noise.

The effects of these noise transmitting rigid attachment elements are particularly objectionable in multi-unit buildings, such as condominiums apartment buildings, and the like. For example, if two units of the multi-unit building, such as a first dwelling area and a second dwelling area located immediately above the first dwelling area, are separated by flooring assemblies attached to the building structure with sound-bridging mechanical attachment elements, vibrations generated in the second area are transmitted to the first area as noise or other sounds, thereby disturbing the enjoyment of the first area.

In applicant's copending application, Ser. No. 14/093,131, there is described thinner and more economical flooring assemblies comprising flooring elements configured to be joined together to form finished floors having acoustic, sound-attenuating properties which are capable of being attached to building structures such as subfloor substrates in a one-step installation process without creating vibrational energy transmitting sound-bridges through the acoustic portions thereof, even where the flooring assemblies are mechanically attached to structures.

It is an object of the present invention to provide alternative flooring assemblies which are even thinner and less expensive than those described in the copending application and yet provide essentially the same advantages thereof.

SUMMARY OF THE INVENTION

The above and other objects are realized by the present invention, one embodiment of which relates to a flooring assembly comprising a plurality of flooring units, each unit comprising:

a stability core layer having a top surface, a bottom surface and a plurality of edge surfaces, at least two of the edge surfaces having an interlocking mechanism for attachment to the edge surfaces of the stability core of adjacent flooring units;

a sound attenuating acoustic layer attached to the bottom surface of the stability core layer; and a finish layer attached to the top surface of the stability core layer, wherein:

(1) each of said stability core layer and said sound attenuating acoustic layer are polygonal,
(2) said assembly is attachable to a surface of a structure, and
(3) none of the edges of said sound attenuating acoustic layer have an interlocking mechanism for attachment to an edge of an adjacent sound attenuating acoustic layer.

The flooring assembly of the invention is constructed as to be easily attachable to a surface of a building structure

DETAILED DESCRIPTION OF THE INVENTION

Figure 1:
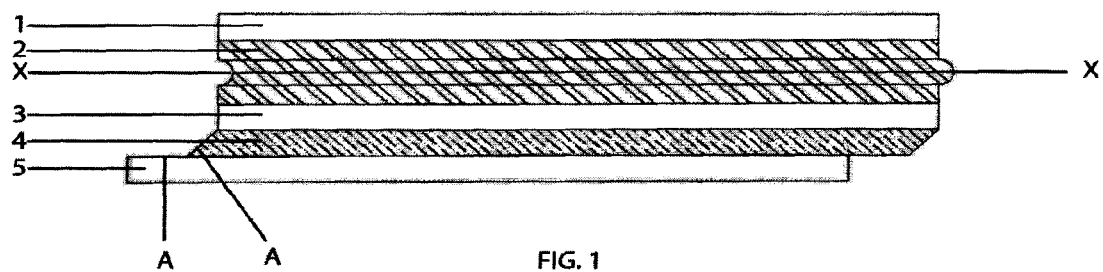
FIG. 1 is a side elevational view of the flooring unit of the invention.

The invention is predicated on the discovery that flooring assemblies constructed from flooring units as described above effectively isolate any rigid mechanical connecting elements from the finish floor layer thereby avoiding any direct transmission of sound energy between the finish layer and the building structure.

Embodiments of the present disclosure will be described with reference to the drawings. While various exemplary and preferred embodiments will be described, the disclosure is not limited thereto. On the contrary, various modifications and similar arrangements (as would be apparent to those skilled in the art) are intended to also be covered. Therefore, the scope of the appended claims should be accorded the broadest possible interpretation so as to encompass all such modifications and similar arrangements, Referring to FIGS. 1 and 2, a flooring unit 10 is shown. The unit 10 includes a first polygonal stability core layer 2 having an interlocking mechanism: tongue x and groove y construction along at least two, preferably opposed, lateral edges for attachment to the edge surfaces of the stability core layer of an adjacent flooring unit. To the bottom surface of the stability core layer 2 is attached a sound attenuating acoustic layer 4. On the top surface of the stability core layer 2 is attached a finish layer 1.

Between the acoustic layer 4 and core layer 2, an optional filler layer 3 (further described below) may be interposed. To the bottom surface of the acoustic layer 4, an optional backing layer 5 (further described below) may be attached. The filler and backing layers are employed in order to manage the thickness of the assembly and maintain material balance, where required.

Each of layers 1-3 and 5 are preferably identically polygonal in shape that may take any form, such as, for example, rectangular (boards, sheets, and the like) or square (tiles and the like). Each of the above described layers may be attached to each other by any suitable means; most preferably, adhesively.

The assembly of flooring units of the invention is attachable to a surface of a building structure; e.g., a sub-flooring surface by (1) an adhesive, (2) a mechanical connector, or (3) a combination of (1) and (2).

Figure 2:
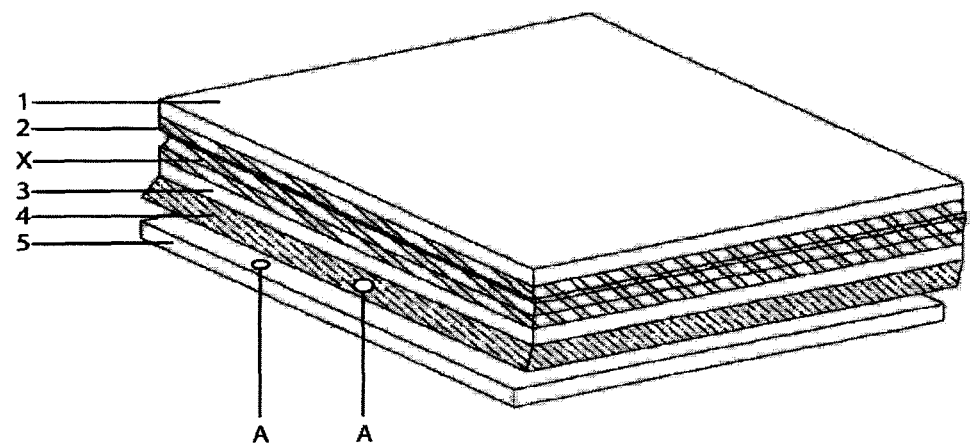
FIG. 2 is a top elevational view of the flooring unit of the invention.

Thus, a primary advantage of the flooring units of the invention is that they may be assembled and attached to a building structure, such as, for example, a sub-floor to achieve an acoustic floor having no penetrating mechanical connections or rigid penetrations [such as nails] through the "acoustic layer" which would allow sound to bridge the layer, thereby denigrating the sound attenuating properties thereof, and achieving, at the same time, a durable connection between the building structure and the acoustic floor assembly. This is enabled by the unique construction of the flooring units Which allows the mechanical connection to occur anywhere in the lower portion of the acoustic layer 4 or the backing layer 5. Referring to FIGS. 1 and 2, the preferred mechanical connection locations are in the lower portion A of the acoustic layer 4 so that it may be covered by an overlapping acoustic layer from the adjoining piece of Mooring or in the backing layer 5, avoiding altogether any acoustic penetrations through the acoustic layer that may bridge any sound from the top finish surface 1 to the building structure. The mechanical connector may take any suitable form, such as, for example, nail, screw, staple, bolt, clip, snap, and the like.

The construction and attachment of conventional prior art acoustic flooring requires the following steps:

(1) An acoustic layer having the required sound-attenuating value is installed on a subfloor.
(2) Two staggered layers of plywood are attached to the top surface of the acoustic layer adding 1½" of thickness.
(3) A finish flooring layer (if wood, ¾" thickness) is attached by nailing through the intervening staggered layers of plywood and the acoustic layer to the subfloor, thereby creating the undesirable sound-bridges between the finish layer and the subfloor.

Advantageously, the flooring assembly of the invention is constructed and attached to a subfloor as follows:

The assembly as described above, ¾"+acoustic layer, saving 1½" over conventional installation. The assembly of the invention is also advantageous over the assembly described in the above identified patent application in that it is considerably thinner and less expensive to construct.

The assembly of the invention eliminates two of the steps required for the installation of prior art flooring assemblies and results in as much as 1½" thickness saving in overall thickness.

Moreover, the flooring assembly of the invention enables the installation of floors in a one-step process which meet or surpass building sound code requirements [STC and IIC ratings] in most major cities in the world.

The flooring assembly is applicable for the installation of any suitable flooring finish. For example, the finish layer 1 may comprise any suitable material such as, for example, stone, wood, ceramic, metal, fabric, carpet, resin, rubber, polymer, or bamboo. Similarly, the optional filler layer 3 may also be constructed of these same finish or other suitable materials.

The acoustic layer 4 may comprise any suitable sound-attenuating construction material, such as, for example, rubber, polymeric or resinous material.

The stability core layer 2 may also comprise any suitable construction material which will provide structural stability to the flooring unit. Exemplary of such materials are wood, rubber, polymeric or resinous material, or a fiber matrix material.

The filler layer 3 and the backing layer 5 each may be constructed from stone, wood, ceramic, metal, fabric, carpet, resinous, rubber, polymeric, or bamboo material While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

I claim:

1. A flooring assembly comprising at least one flooring unit, each said at least one flooring unit consisting of:
   a single stability core layer having a top surface, a bottom surface and a plurality of edge surfaces, at least two of said edge surfaces having an interlocking mechanism for attachment to the edge surfaces of a single stability core of adjacent flooring units;
   an unbroken sound attenuating acoustic layer attached to the bottom surface of the single stability core layer; and
   a finish layer attached to the top surface of said single stability core layer, wherein:
   (1) each of said single stability core layer and said sound attenuating acoustic layer are polygonal,
   (2) said assembly is attachable to a surface of a structure,
   (3) none of the edges of said sound attenuating acoustic layer have an interlocking mechanism for attachment to an edge of an adjacent sound attenuating acoustic layer, and
   (4) the edges of said sound attenuating acoustic layer in each of said at least one flooring unit overlap the edges of the sound attenuating acoustic layer of adjacent flooring units.

2. The assembly of claim 1 wherein said interlocking mechanisms are tongue and groove construction along opposed lateral edges of said single stability core.

3. The assembly of claim 1 wherein each said at least one flooring unit is attachable to a surface of a structure by a mechanical connector extending through said sound attenuating acoustic layer, but not contacting said finish layer or stability core.

4. The assembly of claim 3 wherein said mechanical connector extending through said sound attenuating acoustic layer, but not contacting said finish layer is a nail, screw, staple, bolt, clip, or snap.

5. The assembly of claim 4 wherein said mechanical connector is a nail.

6. The assembly of claim 1 wherein said layers are attached to each other by an adhesive.

7. The assembly of claim 1 wherein said finish layer comprises stone, wood, ceramic, metal, fabric, carpet, resin, rubber, polymer, or bamboo.

8. The assembly of claim 1 wherein said stability core layer comprises wood, rubber, polymeric, or resinous material, or a fiber matrix material.

9. The assembly of claim 1 which is square or rectangular in shape.

10. The assembly of claim 1 wherein said flooring unit is in the form of boards.

11. The assembly of claim 1 wherein said flooring unit is in the form of tiles.

12. The assembly of claim 1 wherein said building structure surface to which said assembly is attachable is a sub-floor.

* * * * *